Feb. 24, 1959 R. L. THOMAS, JR 2,874,588
CONTROL CABLE DEVICE WITH TENSIONING MEANS
Filed Sept. 24, 1954
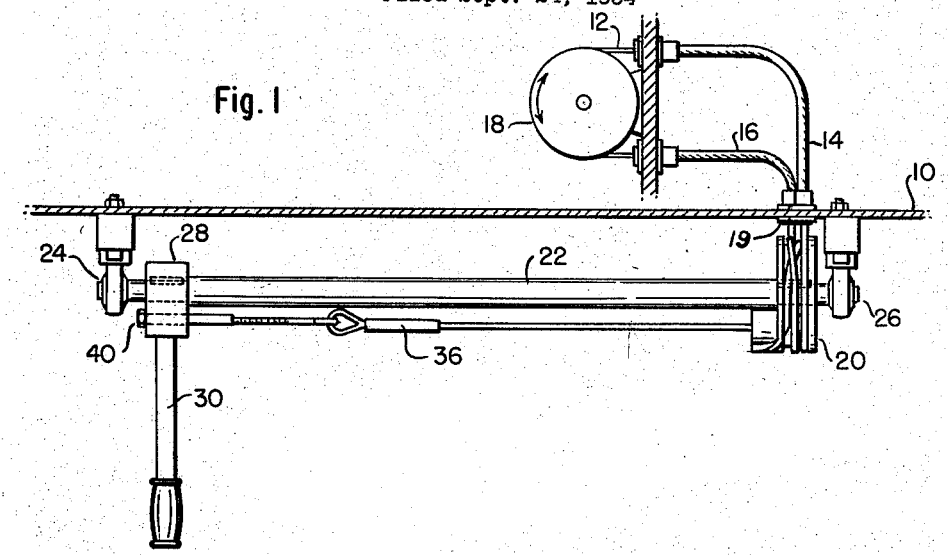
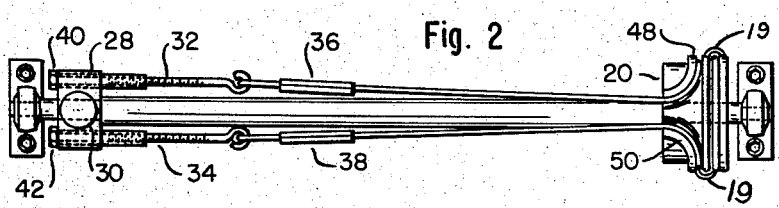
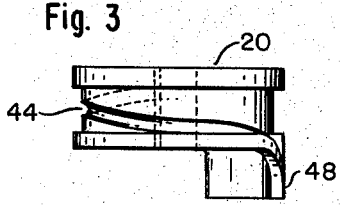
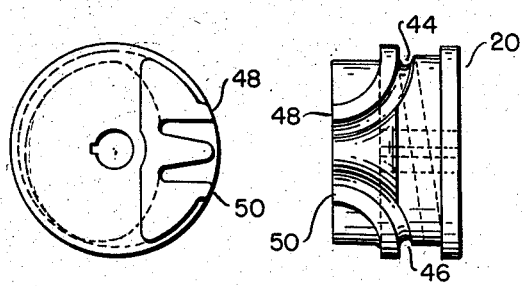
INVENTOR.
Roy L. Thomas, Jr
BY Kenway Jenney
Walter & Heldrett
Attys.

United States Patent Office 2,874,588
Patented Feb. 24, 1959

2,874,588

CONTROL CABLE DEVICE WITH TENSIONING MEANS

Roy L. Thomas, Jr., Worcester, Mass., assignor to Rockwood Sprinkler Company, Worcester, Mass., a corporation of Massachusetts Application September 24, 1954, Serial No. 458,129

7 Claims. (Cl. 74—501)

The present invention relates to cable control apparatus and in particular to a cable take up and control drum.

In many types of equipment it is desirable to utilize cables in order to effect remote control of various movable operating parts. Frequently where such a cable would otherwise be exposed to the weather or to fouling by foreign objects it is desirable to run the cable inside metal sheathing or conduits. Apparatus of this type is shown in the copending application of Howard G. Freeman, Serial No. 262,958 filed December 22, 1951, now Patent No. 2,698,665, where a pair of cables is utilized to control the various nozzles used on a fire-fighting turret.

It is necessary in any case where cables are utilized for control purposes that there be a convenient means in the form of a turnbuckle or other take-up mechanism to tighten the cable. It is impossible to apply such a tightening turnbuckle to the portion of the cable which is running through a metal sheath. It has therefore been necessary in the past to run the cables for a considerable length in the open where a turnbuckle attachment could be applied before finally winding them on the actuating drum.

A typical situation is shown in the above mentioned application where cable pairs are used. The cables apply opposing forces to a controlled piece of apparatus. These cables run through sheaths on top of a fire or crash truck and then pass from the outside of the truck to the inside, where they run in the open for a considerable distance before passing around the actuating drum. The turnbuckle which tightens the control cable is attached in this open run inside of the truck. However this arrangement is wasteful of space and requires that the cables be in the open where they may become fouled.

It is therefore the object of this invention to provide a cable assembly with means for take-up, and capable of being accommodated in a minimum of space.

It is a feature of this invention that it eliminates some of the pulleys with their attendant friction which are otherwise necessary in directing the cable. It is a further feature of the invention that the actuating drum which takes up and releases the cables may be placed inside the truck directly facing the openings to the cable sheaths so that the cable passes directly off the drum into the sheath.

Fig. 1 represents a side elevation showing the preferred form of the invention.

Fig. 2 is a view from below of the apparatus shown in Fig. 1.

Figs. 3, 4 and 5 are detail views of the cable take-up drum with its integral cable guides.

The invention is shown and described as embodied in a turret control for a fire truck. The truck is diagrammatically represented in Figure 1 by the cab roof 10. A cable 12 is carried above the roof in two sheaths 14 and 16 to a remote drum or other device 18 which may be moved in either direction depending on which end of the cable is tightened. The drum 18 may operate a variety of devices, as for example, the nozzle control of the type shown in the above-mentioned Freeman application.

In order to achieve smooth rotation of the drum it is necessary that one side of the cable be released in the same amount and at the same time as the other side is drawn in.

The two sheaths project inside the roof 10 through a pair of openings 19 and lead directly into tangential relationship with opposite peripheral portions of an actuating drum 20 which achieves this operation. The cable end lengths are wound around the drum in opposite directions, and the free ends are then turned a quarter turn around the guides 48 and 50 and passed along the drum axis in a manner to be now described.

The drum 20 is keyed to a rotatable shaft 22 which is supported at both ends in bearing housings 24 and 26 which are rigidly fastened to the roof. At the other end of the shaft from the drum is an anchor member 28 which is keyed to the shaft. A handle 30 is attached to the anchor. Two cable take-up members in the form of single-ended turnbuckles 32 and 34 are attached at one end to the anchor member and at the other to an eye which is formed at the end of the cable. Each eye is formed by making a loop in the end of the cable and securing it by the clamps 36 and 38.

Each cable length therefore extends in a straight line parallel to the axis of the shaft and is secured at one end by the turnbuckle which is held to the anchor member. The cable after being positioned is tightened by rotating the nuts 40 and 42 which draw the threaded bolts of the turnbuckle toward the anchor member.

The actuating drum 20 is shown in detail in Figures 3, 4, and 5. It is provided with two grooves 44 and 46 which lead from the drum surface to merge into the cable guides 48 and 50. The principal groove 44 is in the form of a spiral having a somewhat shallower pitch than the groove 46 which leads rapidly to the drum surface from guide 50.

One length of cable; namely, that entering the cab from the sheath 14, passes quickly into the groove 44 and descends therein below the drum surface until it passes around the guide 48 and extends parallel to the axis of the drum. The other cable length enters the cab from the sheath 16 and turns in the opposite direction around the surface of the drum, crossing over the first cable length in the groove 44 without friction or wearing contact. It enters the groove 46 as it commences to turn about the guide 50 and the two lengths emerge from their respective guides equidistant from and parallel to the shaft 22.

It will be seen that movement of the handle attached to the anchor block will serve to rotate the shaft 22 and the drum 20, thus laying out the cable on one side of the drum and reeling in the cable on the other side of the drum. At the same time it will be seen that the anchored portion of the cable which is parallel to the shaft does not change in relation to the drum and the anchoring position as the entire shaft turns. Once the cable has been drawn taut and anchored it is stationary and is not subject to wear. All of the moving part of the cable is limited to that from the drum outwards through the sheaths. It is not necessary to utilize any pulleys or other friction producing guides in order to direct the cable as it passes off the drum into the sheaths.

While the above invention has been described for a particular embodiment, it is apparent that it could be constructed in a number of similar ways without departing from the spirit of this invention.

Having thus described my invention, I claim:

1. Apparatus for controlling a cable comprising a drum around which the cable is wound, guide means on the drum around which the cable ends are turned to direct the cable ends away from the drum in a direction generally parallel to the axis of the drum, a rotatable shaft on which the drum is fixed, cable end anchoring means substantially displaced along the axis from the guide means and rotatable with the shaft, and cable take-up means held by the anchoring means for the end portions of the cable, supporting means for the shaft, and means for turning the shaft.

2. Apparatus for controlling a cable comprising a drum around which the cable is wound, guide means on the drum around which the cable ends are turned to direct the cable ends away from the drum in a direction generally parallel to the axis of the drum, a rotatable shaft on one end of which the drum is fixed, cable end anchoring means connected to the other end of the shaft and rotatable with the shaft, cable take-up means fixed to the anchoring means for the end portions of the cable and means for rotating the shaft to release and retract equal portions of the two cable sections, supporting means for the shaft, and means for turning the shaft.

3. Apparatus for controlling a cable comprising a drum around which the cable is wound, guide means on the drum around which the cable ends are turned to direct the cable ends away from the drum in a direction generally parallel to the axis of the drum, a rotatable shaft on one end of which the drum is fixed, cable end anchoring means on the other end of the shaft, and cable take-up means held by the anchoring means for the end portions of the cable, supporting means for the shaft, and means for turning the shaft.

4. Apparatus for controlling a pair of cable ends comprising a drum around which the cable ends are wound having a pair of counter-directional grooves, one of said grooves carrying one cable end under the other, guide means on the drum around which the cable ends are turned to direct the cable ends in a direction generally parallel to the axis of the drum, a rotatable shaft on one end of which the drum is fixed, cable end anchoring means connected to and rotatable with the other end of the shaft, and cable take-up means for the end portions of the cable.

5. A cable operated remote-control device comprising a shaft, a drum fixed to one end of the shaft, a wall having two openings, journaled supporting means to support the shaft at a distance slitghtly greater than the drum radius from the wall, the drum being adjacent the openings and having diametricaly opposite tangents in respective alignment with said openings, groove means on the drum carrying one cable under the other, guide means around which the cable is turned to direct the cable parallel the shaft, cable anchoring means substantially displaced from the guide means in fixed relation to and rotatable with the shaft, cable take-up means for the end portions of the cable, a pair of cable end sections fastened to the shaft and passing in sequence parallel to the shaft, around the guides, around the drum in opposite directions and out the opening to the remote controlled apparatus, and a handle fixed to the shaft of substantially greater length than the drum radius whereby rotation of the handle will exert substantial force tending to move the cable in either direction.

6. Apparatus for cable control having, in combination, a drum having a pair of counter-directional grooves, guide means on the drum adjacent an end of each groove, a pair of cable ends each passing through one of said grooves and around a guide means, said guide means directing said cable ends adjacent and substantially parallel to the axis of the drum, one of said grooves being deeper than the other by at least the diameter of the cable to carry one cable end under the other, a rotatable shaft on which the drum is fixed, means to rotate the shaft, and adjustable anchoring means for the cable ends connected to and rotatable with the shaft.

7. Apparatus for remote control through a wall having, in combination, a slave drum supported on one side of the wall, a shaft rotatably supported adjacent and parallel to the wall on the opposite side thereof, a control drum keyed to the shaft, means keyed to the shaft and substantially displaced from the control drum to rotate the shaft, a cable having its bight over the slave drum, the ends of the cable passing through the wall and around the control drum and extending from the control drum closely adjacent and substantially parallel to the axis of the shaft to said shaft-rotating means, and adjustable anchoring means to secure said ends to said shaft-rotating means.

References Cited in the file of this patent

UNITED STATES PATENTS

| | | |
|---|---|---|
| 732,057 | Dring | June 30, 1903 |
| 1,878,190 | Schofield et al. | Sept. 20, 1932 |
| 2,491,341 | Tillman | Dec. 13, 1949 |